Sept. 11, 1956 B. R. VENT 2,762,166
APPARATUS AND METHOD FOR TOUGHENING OPHTHALMIC
LENSES, OR THE LIKE, AND TO THE TOUGHENED LENS
Filed May 11, 1953 3 Sheets-Sheet 3
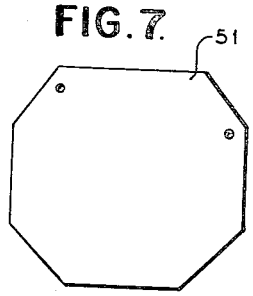
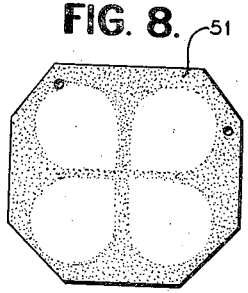
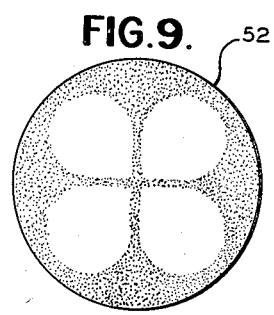
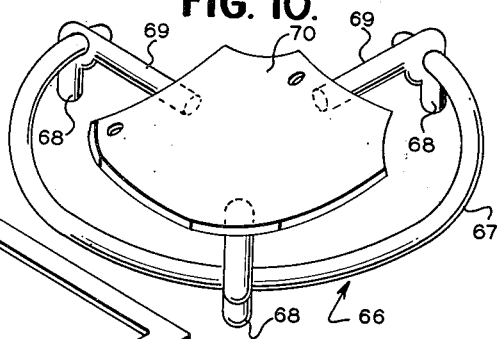
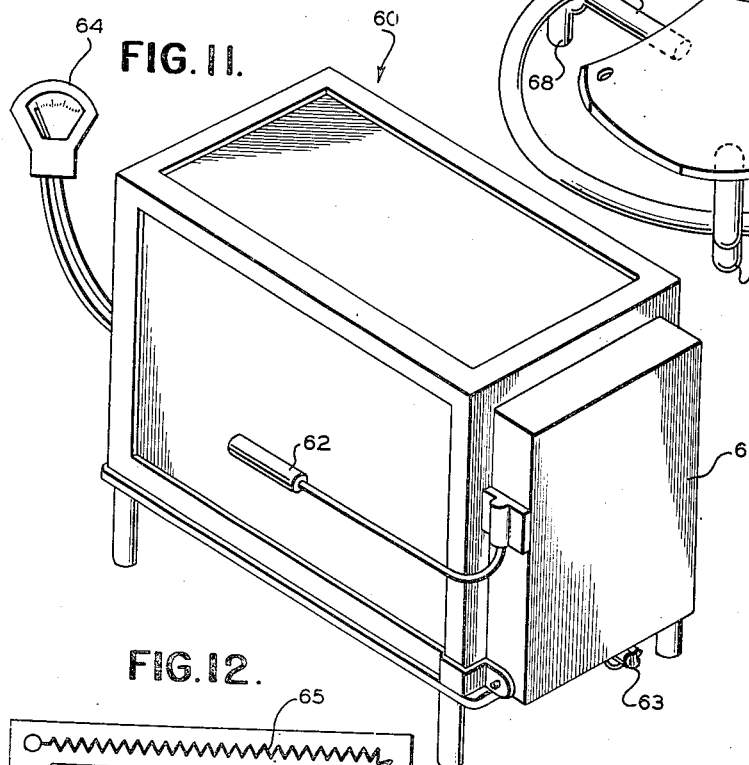
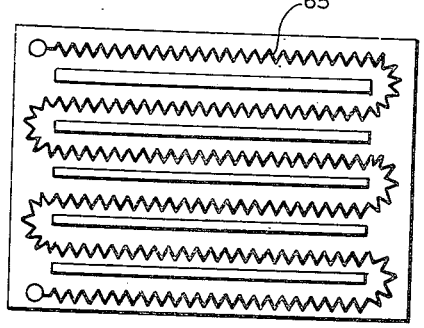
INVENTOR
BRUCE R. VENT
BY Thomas F. Healy
ATTORNEY

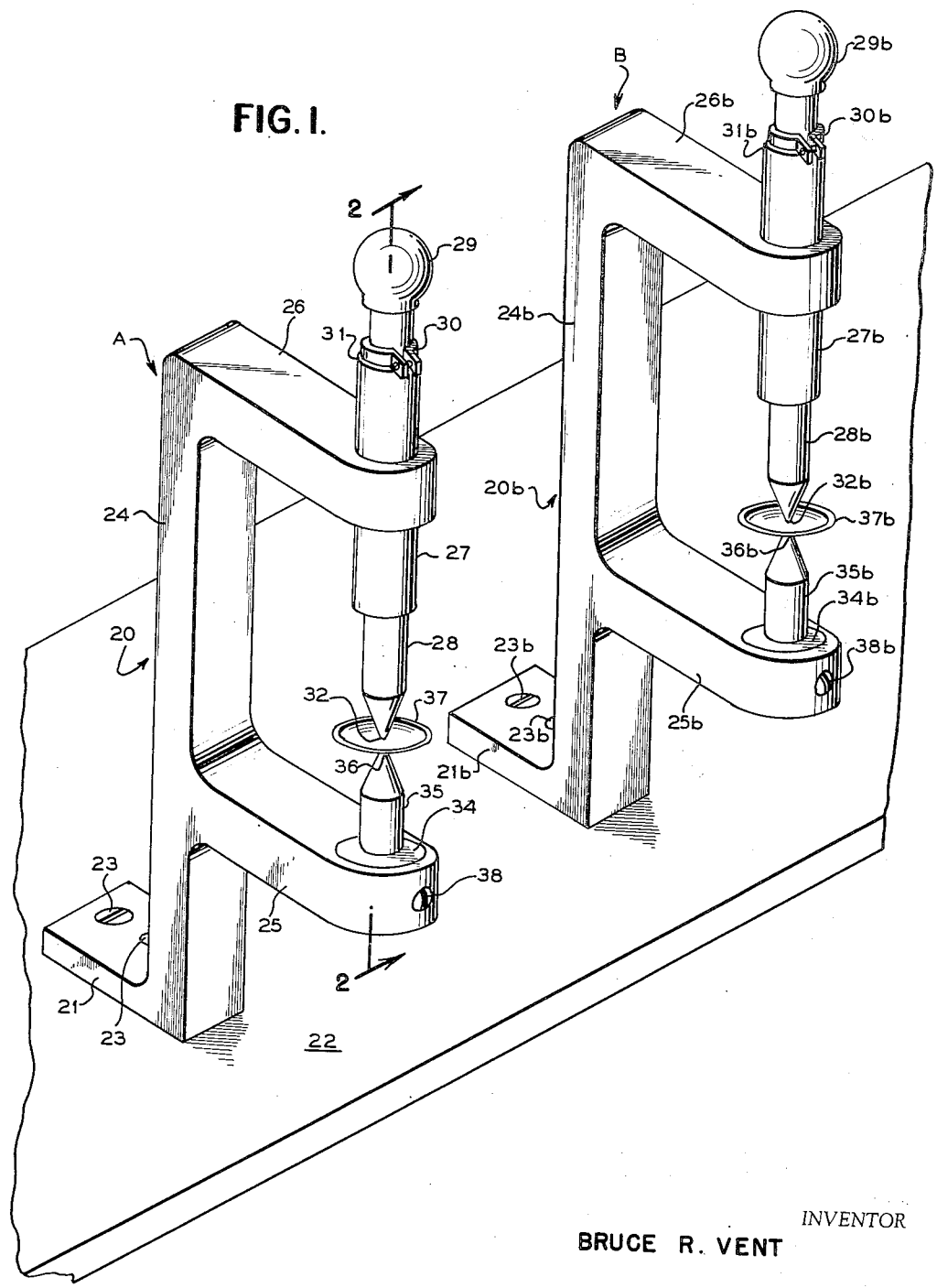

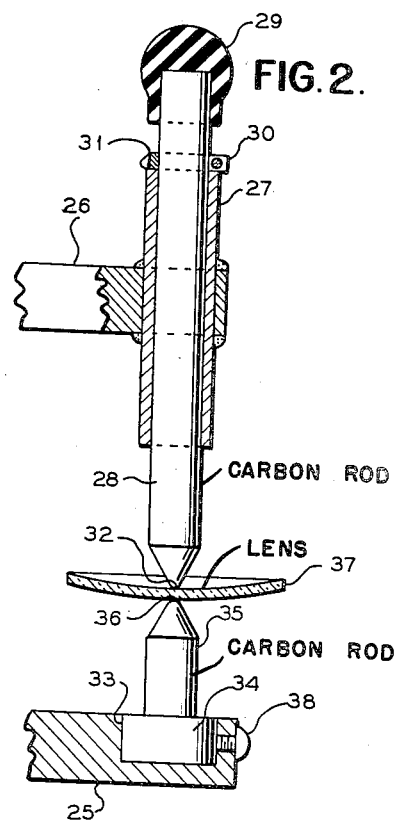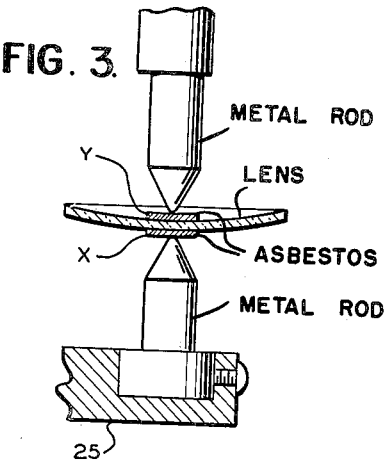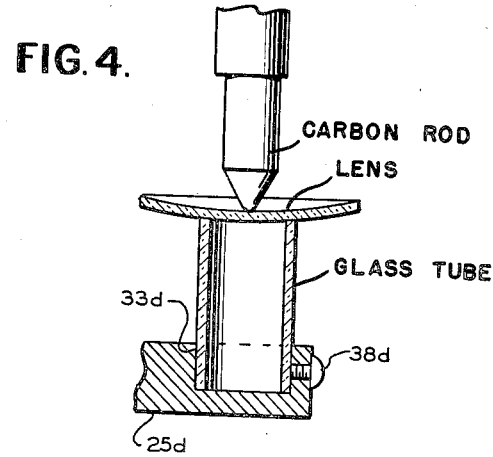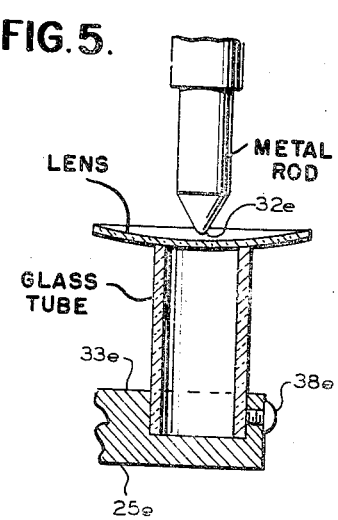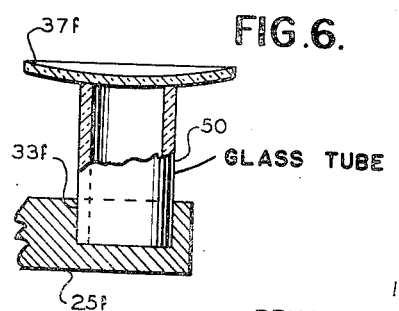

United States Patent Office 2,762,166
Patented Sept. 11, 1956

2,762,166

APPARATUS AND METHOD FOR TOUGHENING OPHTHALMIC LENSES, OR THE LIKE, AND TO THE TOUGHENED LENS

Bruce R. Vent, La Grange, Ind., assignor to Temp-R-Lens, Inc., Washington, D. C., a corporation of Delaware Application May 11, 1953, Serial No. 354,093

31 Claims. (49—45)

The present application is a continuation-in-part of my applications Serial No. 176,847, Serial No. 176,848 and Serial No. 176,849, each of said applications being filed under date of July 31, 1950, said applications being continuations-in-part of my application Serial No. 452,084, filed July 23, 1942, which in turn is a continuation-in-part of my application Serial No. 395,683, filed May 28, 1941, all of said prior applications being now abandoned.

The present invention relates to an Apparatus and Method for Toughening Ophthalmic Lenses, or the like, and to the Toughened Lens.

The invention contemplates the toughening of ophthalmic lenses of any color, kind, size, shape, power or thickness, including bifocal, multifocal or single vision lenses, to render them more resistant to breakage.

The primary object of the invention is to provide a simple, effective method of toughening spectacle lenses, or the like, which preferably have been already ground to provide the necessary curves for the correction of vision, without affecting the optical properties of the lenses or the corrective power factor or without sagging or warping the lenses beyond allowable tolerances.

One of the main objects is to provide a method and apparatus for forming a strain in a lens, or the like, wherein the lens chilling and strain forming step is accomplished solely through the medium of one or more heat conducting elements.

Another object is to provide in a method of toughening a glass blank wherein the glass blank is first heated to approximately its softening point with the time and degree of heating being such that the glass blank substantially maintains its original shape upon chilling; the step of chilling a minor portion of the heated glass blank by gripping said minor portion of said heated glass blank between two oppositely disposed heat conducting elements, thereby to form a strain in said glass blank.

Yet another object is to provide in a method of toughening a glass blank wherein the glass blank is first heated to approximately its softening point with the time and degree of heating being such that the glass blank substantially maintains its original shape upon chilling; the step of selectively chilling a minor portion of a heated glass blank by gripping said minor portion of said heated glass blank between two heat conducting elements, thereby to form a strain in said glass blank.

A further object is to provide in a method of toughening a glass blank wherein the glass blank is first heated to approximately its softening point and thereafter chilled to form a strain therein; the step of chilling a minor portion of the heated glass blank which consists in gripping said minor portion of said heated glass between heat conducting members.

Still a further object is to provide an apparatus for toughening lenses, or the like, which is so constructed and designed that various heat conducting elements may be interchanged to selectively vary the lens chilling step so as to provide various strain patterns in the lenses under treatment.

Yet another object is to provide a toughened lens having a uniform internal strain, and more particularly a plurality of toughened glass blanks each provided with an identical or substantially identical strain pattern.

Another object is to provide a method of toughening a lens employing heat treatment wherein the heated lens is supported between conducting points which properly rapidly chill a minor portion of the heated lens as well as support said lens while chilling, to always conduct the same or substantially the same quantum of heat per unit of time from the lens being chilled.

Another object is to provide a toughened opthalmic lens, such as a spectacle lens, corrected for vision, e. g., a spectacle lens for rimmed glasses and a drilled lens for rimless glasses, characterized by a uniform strain pattern wherein the lens is first heated and then rapidly chilled through the medium of a conducting element, whereby the said lens chilling conducting element is solely responsible for the formation of the strain pattern in the lens.

Still another object is to provide an apparatus for treating heated lenses, or the like, such as watch crystals and cover glasses for instruments, comprising heat conducting means adapted to support the heated lens and simultaneously rapidly chill a minor portion thereof, and more particularly when the heat conducting and supporting means comprise oppositely disposed heat conducting points of carbon, graphite, or the like.

Yet another object is to provide an apparatus of the class described for forming a strain in a heated glass blank by selective chilling to toughen the same comprising, two heat conducting elements, one of said elements being movable, a support for said elements, and each of said elements being shaped at the end of heat transfer thereto so as to chill only a minor portion of a face of the heated glass blank positioned therebetween.

A further object is to provide a plurality of lenses, each of which is characterized by a normally invisible strain pattern of identical or substantially identical shape, e. g. cross-shaped.

Another object is to provide a toughened glass blank characterized by uniform internal strain to permit said toughened blank to be centrally drilled without breaking.

Other and further objects and advantages of this invention will be apparent from the following description thereof and from the claims appended thereto.

Referring to the drawing, wherein like numerals refer to like or corresponding parts throughout the several views:

Figure 1 is a perspective view of two lens toughening apparatuses embodying the features of the present invention;

Figure 2 is a sectional view taken along the line 2—2 of Figure 1 in the direction of the arrows;

Figure 3 is a modified form of the invention shown in Figure 2, wherein two oppositely disposed metal rods provide the lens chilling step;

Figure 4 is a modified form of the invention shown in Figure 2, wherein a carbon rod and a glass tube provide the lens chilling step to toughen the lens;

Figure 5 is a modified form of the invention shown in Figure 2, wherein a glass tube and a metal rod provide the lens chilling step;

Figure 6 is a modified form of the invention shown in Figure 2 wherein a glass tube alone provides the lens chilling step;

Figure 7 is a top plan view of a drilled lens which has been treated in accordance with the method of my invention, using the apparatus of Figure 1;

Figure 8 is a top plan view showing the treated lens of Figure 7 under polarized light illustrating the cross-shaped strain pattern therein;

Figure 9 is a top plan view of an undrilled lens under polarized light which has been treated in accordance with the method of the present invention using the apparatus of Figure 1 showing the identical cross-shaped strain pattern that appears in the lens of Figure 8;

Figure 10 is a perspective view showing the disposition of a drilled lens on a lens stand, ready for insertion into an oven;

Figure 11 shows a perspective view of a constant temperature oven; and

Figure 12 shows an elevation of one of the inner walls of the oven of Figure 11 depicting the exposed heating coils.

Referring now to the drawing, and more particularly to Figure 1, the letters A and B generally show two lens toughening apparatuses embodying the features of the present invention. Lens toughening apparatus A is similar in structure and operation to lens toughening apparatus B.

Apparatus A comprises an upright member generally indicated by the numeral 20, with said upright member being provided with a bottom flange 21 which is anchored to a baseboard 22 by means of screws 23, or like fastening elements. The upright member is provided with a vertical portion 24, from which extend horizontally disposed arms 25 and 26, to provide a C-shaped supporting member for the lens chilling means.

As best shown in Figure 2 of the drawing, the horizontal arm 26 of the C-shaped member is provided with an aperture in the outer end portion thereof adapted to receive a bearing or tubular member 27 which is welded or otherwise secured in place within the aperture of said arm 26. A carbon rod 28 is adapted for vertical movement within the bearing 27, with said carbon rod being provided with a handle or knob 29 on the upper end thereof. Below the handle 29 is an adjustable collar 30 which is secured to the carbon rod 28 and limits the downward movement of said rod 28 by contacting the upper end 31 of the bearing member 27. The collar 30 is so adjusted as to limit the downward movement of carbon rod 28, but permits free vertical movement when it is desired to withdraw the carbon rod 28 from the bearing 27.

The carbon rod 28, at the opposite end thereof from handle 29 is pointed, as at 32, with said point 32 having a rounded portion of approximately one millimeter in diameter.

The lower horizontally disposed arm 25 of the C-shaped supporting member is provided with a recessed portion 33 in the outer end portion thereof, which recessed portion 33 is adapted to removably receive a circular rod supporting element 34, with said circular rod supporting element 34 being provided with a central aperture adapted to receive a carbon rod 35 which is pointed at 36, in a manner similar to the pointed portion 32 of carbon rod 28.

In the operation of apparatus A, a heated lens 37 is gripped and supported in mid-air between the carbon points 32 and 36, which carbon points chill minor portions on opposite sides of the lens 37 in such a manner as to provide a cross-shaped strain pattern, similar to the strain pattern shown in Figure 9 of the drawing.

When it is desired to change the carbon rod 35, and introduce a different type of heat conducting element, segment 34 can be removed from recess 33 in the arm 25, by unscrewing the set screw 38, and lifting the carbon rod 35 and circular segment 34 from said recess 33.

The apparatus B is similar in structure and operation to apparatus A and comprises an upright supporting member generally indicated by the numeral 20b and includes a base flange 21b secured to the baseboard 22 by means of screws 23b or in any other suitable manner. The upright 20b has a vertically disposed arm 24b and two horizontally disposed arms, the lower one of which has been designated by the numeral 25b, and the upper arm by the numeral 26b, so as to provide a C-shaped rod supporting assembly.

The outer end portion of arm 26b is apertured to fixedly receive a vertically disposed tubular rod supporting member 27b adapted to receive a carbon rod 28b which is provided with a handle 29b on the upper free end thereof. An adjustable collar 30b is secured to carbon rod 28b on the upper portion thereof, below handle 29b. Said collar 30b limits the downward vertical movement of rod 28b in tube 27b by engaging the end 31b of tube 27b. The other free end of carbon rod 28b is pointed at 32b.

A circular removable rod supporting element 34b is disposed in a suitable recess in the outer end portion of arm 25b, with said element 34b being recessed to receive a vertically disposed carbon rod 35b which is pointed at 36b, the free end portion thereof.

In toughening lens 37b the lens is preferably first uniformly heated to a temperature approaching the softening temperature of the glass, and thereafter selectively chilled by gripping a minor portion of the said heated lens in mid-air between the vertically disposed carbon rods 28b and 35b which are preferably oppositely positioned and substantially in coaxial alignment. The heated lens 37b is permitted to otherwise cool naturally. The toughened lens, under polarized light, will show a strain pattern like the strains shown in Figure 8 and Figure 9 of the drawing.

If it is desired to change the strain pattern, element 34b and rod 35b may be removed from arm 25b first loosening set screw 38b, and a glass tube, or other heat conducting tube, may be substituted, to give a lens chilling assembly or means such as shown in Figure 4 of the drawing. By selectively changing the particular heat conducting elements as to shape and area of contact with the heated lens under treatment, many different strain patterns may be formed.

In the preferred practice of the invention, the lens, or the like, is first uniformly heated to a temperature approaching the softening temperature of the glass. This temperature will vary depending upon the composition of the glass. Usually, it takes a longer period of time to heat a thick lens, or like glass blank, at the proper temperature so that selective chilling of the heated lens will provide a strain.

The lens should not be heated for such a time and at such a temperature that it warps or sags. As a lower temperature limit, the lens should be heated for such a time and at such a temperature that selective chilling of the heated lens in accordance with the method of the invention will provide a strain therein, which strain becomes visible under polarized light.

The present invention is primarily concerned with the lens chilling step and the apparatus for carrying out the said lens chilling step.

In carrying out the preferred form of this invention there are several important features. One, the glass blank being toughened should be of such geometrical proportions that it may be gripped horizontally between two vertically positioned oppositely disposed heat conducting elements. Secondly, the heat conducting element is solely responsible for conducting sufficient heat from a minor portion of the heated glass blank to form the strain in the glass blank. Thirdly, in the selective chilling step, a minor portion of the heated glass blank is chilled to form strain in said glass blank. Fourth, the glass blank being toughened should not be heated beyond its softening temperature so that the said glass blank is warped out of shape, or does not substantially maintain its original shape after the chilling step.

Referring to the drawing, and more particularly to Figure 3 thereof, there is shown a modified form of the apparatus more fully shown in Figures 1 and 2 of the drawing. In the apparatus of Figure 3 metal rods, such as iron rods, are substituted for the carbon rods of the apparatus shown in Figure 1.

The only other difference between the apparatus of Figure 3 and the apparatus shown in Figure 1 of the drawing is the provision of asbestos pads X and Y which are disposed next to the heated lens which is positioned between the pointed metal rods, in such a manner that the metal rods do not conduct heat away from the heated lens at so fast a rate that the heated lens is cracked. The apparatus of Figure 3 will form a strain pattern in the lens similar to the pattern shown in Figures 8 and 9 of the drawing.

Referring now to Figure 4 of the drawing, there is shown a modified form of the invention wherein the heated lens being toughened is positioned on a glass tube which is of sufficient diameter to independently support the said heated lens during the lens chilling step. A pointed carbon rod, similar to the rod 28, is vertically positioned and adapted to move into and out of engagement with a minor portion of the heated lens being toughened and is also adapted to rapidly chill said portion of the concave face of the heated lens when the said heated lens is positioned on the glass tube in the manner shown in Figure 4 of the drawing. The glass tube of Figure 4 may be removed from the recess 33d in the outer end portion of the arm 25d by operation of the set screw 38d, so as to interchange the heat conducting elements, when desired, by substituting the member 34 and carbon rod 35 for the glass tube.

Referring to Figure 5 of the drawing, there is shown another modified form of the invention wherein the heated lens is disposed on a glass tube, in a manner similar to the apparatus of Figure 4. The glass tube is vertically positioned in a recess 33e in the outer end portion of arm 25e, and said glass tube, or other suitable heat conducting tube, may be removed from said recess 33e by operating set screw 38e. However, a metal rod, which is vertically movable, is disposed in heat transfer relationship with the concave face of the heated lens disposed on the glass tube, with the convex face downward but does not contact said heated lens. The metal rod is pointed as at 32e and is adapted to transfer heat from or chill a minor portion of the concave face of the lens being toughened. At the same time, the glass tube which supports the heated lens is adapted to chill a minor portion on the convex face of the heated lens, so that the chilling step comprises the chilling of both the convex face and the concave face of the heated lens in such a manner as to form strain in the lens and to toughen the same.

Referring now to Figure 6 of the drawing, there is shown a modified form of the invention wherein a glass tube 50 is fitted into a recess 33f disposed in the outer portion of arm 25f. The tube 50 is vertically disposed and a heated lens 37f is supported thereon in such a manner that the glass tube 50 will chill a minor portion of one face of the heated lens 37f in such a manner as to toughen the face being selectively chilled, at the same time it independently supports the heated lens 37f.

The composition of the rods or other heat conducting elements employed in conducting heat away from the heated lens can vary. Ordinarily, such metals as iron, copper or other metals of high heat conductivity are unsuitable in the preferred method of chilling the lens by directly gripping the heated lens between two conductors, unless some insulating material as asbestos is employed to insulate the cold metal from the hot lens. This results from the fact that the area of lens contact has to be so small when employing metals so that the lens will not crack that it is difficult to apply lens supporting pressure on the metal rods without bending the points out of shape or denting the lens supported therebetween. Usually the heated lens will crack when cold metals having a high coefficient of heat conductivity contact the heated lens where the circular area of contact has a diameter of 1 mm. or more, for example, those metals having the same or a higher conductivity than iron.

Carbon and graphite are suitable as heat conducting materials in the preferred practice of applying lens supporting pressure to a heated lens, for their coefficients of conductivity are of such magnitude relative to the coefficient of conductivity of air that a too rapid dissipation of heat does not occur at the point or points that the carbon or graphite rod contacts the heated lens while it is chilled so as to crack the lens. Other heat conducting materials are suitable provided their coefficients of conductivity are not so high that heat is conducted away from the heated lens at so rapid a rate that the lens cracks.

A person skilled in the art can ascertain suitable heat conducting materials by reviewing the conductivities of the materials and comparing these conductivities with the conductivity of air having in mind that in the preferred practice of the invention metals, such as copper, iron and steel are generally unsuitable for direct contact with a heated lens, and that materials such as carbon and graphite have suitable coefficients of conductivity for direct contact with the heated lens, other factors being equal.

Heat conducting materials having lower coefficients of conductivity than carbon and graphite are suitable to conduct heat away from the heated lens provided the ratio of the heat conductivity of the heat conducting material to the heat conductivity of air is such that heat is conducted away from the heated lens through the medium of the heat conducting material at a fast enough rate compared to the rate at which the remaining portion of the heated lens loses its heat to the surrounding air so that a normally invisible strain pattern is formed in the lens or the lens is toughened.

The shape of the strain pattern depends upon the relationship of the area of contact of the heat conducting material with the heated lens relative to the remaining portion of the lens which loses its heat to the air surrounding the lens as it otherwise cools naturally. In this connection, attention is directed to Figures 7, 8 and 9 of the drawing. In Figure 7, the numeral 51 indicates a drilled lens toughened by the apparatus of Figure 1. Figure 8 shows lens 51 under polarized light and illustrating a four leaf strain pattern. In Figure 9, the numeral 52 illustrates an undrilled lens toughened with the apparatus of Figure 1, and showing the same four leaf strain pattern as is present in the lens 51 of Figure 8. The strain patterns in the lenses can be changed by changing the shape of the heat conducting element at the area of heat transfer. This is an important feature as it furnishes a means of identifying toughened lenses as to source.

Materials having higher coefficients of conductivity than carbon or graphite and yet lower than metals like iron may be used for direct contact with the heated lens provided their coefficients of heat conductivity are not so high relative to the conductivity of air that the lens cracks in the lens chilling step.

Generally, any heat conducting material, as differentiated from a fluid medium, which has a coefficient of heat conductivity greater than that of air is suitable in the practice of my invention provided a relationship of heat transfer can be established relative to the heated lens so that the heat is conducted away at different rates from the heated lens in such manner that a normally invisible strain is formed in the lens, or the lens is toughened. If the heat conducting material has a coefficient of heat conductivity which is too great compared with air, an insulating material, such as asbestos, can be employed to decrease the rate at which the heat is dissipated so as not to crack the lens. It is preferred to exert pressure at a point on the asbestos pad which contacts the heated lens to insure a heat dissipation at this point and to insure a well defined strain pattern, as well as supporting the lens while it otherwise cools naturally.

In the heat treatment of the optical lens, or other glass blank, prior to the lens chilling step, any suitable temperature controlled oven may be employed. It is preferred to employ an oven having exposed coils in the two side walls thereof. Depending upon the particular type of oven employed, the position of the pyrometer, and other factors, the time and temperature of lens heating may vary somewhat.

Referring now to Figures 10, 11 and 12 of the drawing, the numeral 60 generally indicates a temperature controlled oven which is provided with a door 61 hingedly secured to the frame thereof and adapted for easy opening and shutting. A handle 62 is secured to door 61 to open and close the same. The numeral 63 indicates a switch for selectively controlling the temperature within the oven 60, having reference to a pyrometer 64. The temperature within the oven is controlled by selectively increasing or decreasing the current flowing through the exposed resistant coils 65 disposed within the oven 60, preferably in the side walls thereof.

A lens stand generally indicated by the numeral 66 comprises a split substantially circular iron portion 67 provided with three equally spaced apart supporting legs 68, with said supporting legs 68 each being provided with an inwardly extending portion 69. The portions 69 project downwardly and inwardly toward a common point within the circular ring 67, but do not meet, to provide a resting place for a lens 70. The lens stand 66 can be made of any other suitable material, for example refractory material.

The following examples will illustrate the various modified forms of the invention and do not limit the scope thereof.

*Example I*

A spectacle lens, corrected for vision and made of ordinary spectacle crown glass, is uniformly heated in a temperature controlled oven for three minutes at a temperature of 1150° F. After the heating period the heated lens is carefully removed from the oven and substantially centrally supported between two oppositely disposed vertically positioned pointed carbon or graphite rods, having a rounded pointed portion of 1 mm. diameter and allowed to otherwise cool naturally in its supported position. When the lens is viewed through a Colmascope a cross-shaped strain pattern is visible. (See Figure 9.) It is preferred to dispose the heated lens between two conducting points but, if desired, one face of the lens may be cooled more rapidly than the other face through the medium of one conducting point. If desired, heat conducting elements having different coefficients of heat conductivity may be employed.

*Example II*

A drilled spectacle lens is treated like the lens of Example I. When the second lens is viewed through a Colmascope, the cross-shaped strain pattern is visible, which is the same as the cross-shaped strain pattern appearing in the lens of Example I. (See Figures 7 and 8.)

*Example III*

A drilled ophthalmic lens approximately 2 mm. thick at its thinnest point, made of spectacle crown glass and corrected for vision, is heated in a temperature controlled oven for five minutes at a temperature of 1125° F. After the heating period the heated lens is carefully removed from the oven and heat is rapidly conducted away from one or more points on the surface of the heated lens through the medium of one or more pointed pencil-shaped carbon rods having a rounded pointed portion of 1 m. diameter which contacts the heated lens. The remaining portion of the lens is preferably allowed to otherwise cool naturally.

*Example IV*

A spectacle lens, corrected for vision and made of ordinary spectacle crown glass, is uniformly heated in a temperature controlled oven for three minutes at a temperature of 1150° F. After the heating period the heated lens is carefully removed from the oven and substantially centrally supported between oppositely disposed carbon rods having a rounded pointed portion of 1 mm. diameter and a glass tube. (See Figure 4.)

*Example V*

The lens treatment of Example IV, wherein the rapid cooling step is accomplished through the medium of any heat conductor. (See Figure 6.)

*Example VI*

A drilled spectacle lens, corrected for vision, of conventional shape and made of spectacle crown glass and suitable for rimless glasses, having a thickness of approximately 2.0 mm. at its thinnest point, is uniformly heated between 1140° F.–1155° F. for a period of 2.5–3 minutes in a temperature controlled oven to a temperature approaching the softening temperature of the glass without warping or sagging the lens. Said heated lens is then removed from the oven and heat rapidly conducted away from the center of the lens through the medium of two oppositely disposed metal rods having a rounded pointed lens contacting surface of 1 mm. Asbestos pads are positioned between the pointed metal rods and the heated lens. A normally invisible cross-shaped strain pattern will be visible when the lens is viewed through a Colmascope. (See Figure 3.)

*Example VII*

A lens, corrected for vision, or an unground lens blank is uniformly heated to a temperature approaching the softening temperature of the glass, the time and degree of heating being such that the lens or blank substantially maintains its original shape without sag or warp beyond allowable tolerances. The heated lens or lens blank is rapidly chilled on one face through the medium of a metallic conductor which is positioned in a heat transfer relationship with the heated lens but does not directly contact the same. (See Figure 5.)

In treating colored lenses the temperature of heating is generally lower because of the difference in the composition of the lenses. The colored lenses absorb heat much more readily than colorless lenses and, consequently, the temperature or time of heating must be decreased. The specific temperature and time of heating depends upon the specific composition of the colored lens being treated.

Good results can be obtained if the lenses which have been corrected for vision and are being treated according to my method for toughening optical glass, are made of spectacle crown glass free from bubbles or flaws which are visible to the unaided eye. The surfaces of the lens should be completely polished and free from defects which affect optical performance. The lenses should be cleaned before treatment in order to insure best results. Satisfactory results can be obtained with optical glass of any quality.

Generally, the temperature and time for which any one lens is heated prior to the step of conducting heat away from the heated lens at a rate which is different from the rate at which the heated lens would normally cool so as to form a normally invisible strain pattern in the said lens, depends upon the proportions, composition and character of the particular lens being treated. Ordinarily when dealing with a lens of spectacle crown glass, it is preferred to operate within the 1100°–1200° F. range.

As a lower limit for heating the glass it should be heated for such a time at any temperature so that strain is obtained in the lens in the lens chilling step.

When treating a lens of greater thickness, it is preferred to heat the lens for a longer time. For example, a lens of 3 mm. thickness at its thinnest point can be heated for about five minutes at 1150° F. with good results.

Greater care must be exercised when treating a lens having a thickness of 0.5 mm. to 1 mm. at its thinnest point for fear of overheating the lens. When treating such thin lenses, it is preferred to work at lower temperatures for a longer time of heating to minimize error.

It is impossible to specifically set out all the operating conditions as to temperatures and times for all various sized lenses or other glass blanks of varying thicknesses and compositions. It is important to remember that a lens should be heated to a temperature approaching the softening temperature of the glass, and for such a period of time that the lens retains or substantially retains its original shape upon cooling within allowable tolerances.

In carrying out the preferred form of my invention wherein the lens is horizontally gripped in mid-air between heat conducting elements while cooling, I select any ordinary spectacle lens, which has been corrected for vision. The oven is preferably heated up to 1200° F. to thoroughly heat the walls thereof. The rheostat or oven switch is then regulated so that the oven temperature is 1150° F. as indicated by the pyrometer.

The lens being treated is cleaned and placed in the lens stand, convex surface down. If the lens is drilled, it preferably should be placed on the stand so that the holes in the lens will not be over any one of the three arms on the lens stand. If the lens is bifocal, the bifocal segment should not touch any one of the three arms on the stand.

While the oven is heating, it is preferred to place the lens to be treated on the top thereof so as to remove the chill therefrom before inserting the lens and stand into the hot oven.

When the oven is at 1150° F., the lens stand and lens are inserted into the oven and the door quickly closed so as to maintain the temperature substantially at 1150° F. The temperature may vary somewhat from 1150° F. without affecting results, but it is preferred to maintain this temperature.

The lens is heated for three minutes and then withdrawn and placed between the carbon points 32 and 36 by elevating the rod 28 and then carefully bringing it in contact with heated lens on a central point thereof and lowering the rod 28 and heated lens until said heated lens rests upon the point 36. The lens stand encircles the lower rod 35 and is removed therefrom.

The heated lens is gripped between the points 32 and 36 and is allowed to otherwise cool naturally. After the lens cools, it shows a well defined cross-shaped strain pattern therein which is visible through a Colmascope. (See Figure 8.)

While the said heated lens cools, supported between points 32 and 36, another lens can be heated in the oven. The operation can be controlled so that a plurality of lenses can be serially treated, each of said lenses being characterized by an indentical or substantially identical normally invisible strain pattern.

The apparatus employed in describing the invention is merely illustrative. Any suitable means can be employed to heat the lenses at substantially a constant temperature for a certain length of time depending upon the composition of the optical glass being treated. Other suitable means for gripping the heated lens, wherein a different heat transfer relationship is established at the point of gripping pressure, will be obvious to those skilled in this art.

The apparatus for toughening a glass blank, such as a lens, preferably consists of a plurality of heat conducting members with at least one of said plurality of members being movable toward and away from another of said plurality of said heat conducting members, and at least two of said heat conducting members including said movable member together cooperating to pressure or grip and support said heated glass blank in mid-air therebetween to chill said heated glass blank and create strain therein. It is preferred that each of the gripping and supporting heat conducting members including the movable member or members be shaped at the gripping and supporting end thereof to conduct heat from a minor portion on a face of the heated glass blank supported therebetween.

It is preferred to employ two oppositely disposed vertically positioned heat conducting members in substantial coaxial alignment to accomplish the chilling step in toughening a heated glass blank, or the like, and it is preferred that each of said heat conducting members be shaped at one end thereof to conduct heat from a minor portion on a face of the heated glass blank positioned therebetween.

It is to be understood that various modifications of the present invention will be apparent to those skilled in this art without departing from the spirit of this invention.

What I claim is:

1. In a method of toughening a spectacle lens corrected for vision and having a convex face and a concave face wherein the lens is first heated to approximately its softening point with the time and degree of heating being such that the lens substantially maintains its original shape upon chilling without affecting the correction for vision in the lens; the step of conducting heat from a minor portion on the convex face and a minor portion on the concave face of the heated lens by substantially centrally gripping and thereby supporting the heated lens at said minor portions in mid-air between two oppositely disposed substantially vertically positioned pointed lens supporting carbon rods, thereby to form a cross-shaped strain pattern in said lens.

2. In a method of toughening a spectacle lens corrected for vision and having a convex face and a concave face wherein the lens is first heated to approximately its softening point with the time and degree of heating being such that the lens substantially maintains its original shape upon chilling without affecting the correction for vision in the lens; the step of conducting heat from a minor portion on the convex face and a minor portion on the concave face of the heated lens by substantially centrally gripping and thereby supporting the heated lens at said minor portions in mid-air between two oppositely disposed substantially vertically positioned pointed lens supporting heat conducting members, thereby to form a cross-shaped strain pattern in said lens.

3. In a method of toughening a spectacle lens corrected for vision and having a convex face and a concave face wherein the lens is first heated to approximately its softening point with the time and degree of heating being such that the lens substantially maintains its original shape upon chilling without affecting the correction for vision in the lens; the step of conducting heat from a minor portion on the concave face and a minor portion on the concave face of the heated lens by substantially centrally gripping and thereby supporting the heated lens at said minor portions in mid-air between two substantially oppositely disposed substantially vertically positioned lens supporting heat conducting members, thereby to form a strain pattern in said lens.

4. In a method of toughening a spectacle lens corrected for vision and having a convex face and a concave face wherein the lens is first heated to approximately its softening point with the time and degree of heating being such that the lens substantially maintains its original shape upon chilling without affecting the correction for vision in the lens; the step of conducting heat from a minor portion on the convex face and a minor portion on the concave face of the heated lens by gripping and thereby supporting the heated lens in mid-air between two heat conducting lens supporting members each shaped to conduct heat from a minor portion of a face of said heated lens, thereby to form a strain in said lens.

5. In a method of toughening a glass blank such as a lens, lens blank, watch crystal, or the like having two faces wherein the glass blank is first heated to approximately its softening point with the time and degree of heating being such that the glass blank substantially maintains its original shape upon chilling; the step which consists of conducting strain forming heat from a minor portion on one face and a minor portion on the opposite face of the heated glass blank by gripping the heated glass blank at the said minor portions and thereby supporting the heated glass blank in mid-air between two oppositely disposed glass blank supporting heat conducting members each shaped to conduct heat from a minor portion of a face of said heated glass blank, thereby conducting heat from the said minor portions of the heated glass blank at a rate sufficient to form a normally invisible strain in said glass blank without cracking the same.

6. In a method of toughening a glass blank such as a lens, lens blank, watch crystal, or the like having two faces wherein the glass blank is first heated to approximately its softening point with the time and degree of heating being such that the glass blank substantially maintains its original shape upon chilling; the step which consists of conducting strain forming heat from a minor portion on one face and a minor portion on the opposite face of the heated glass blank by substantially horizontally gripping the heated glass blank at the said minor portions and thereby horizontally supporting said heated glass blank in mid-air between substantially vertically disposed glass blank supporting heat conducting members each shaped to conduct heat from a minor portion on a face of said heated glass blank, thereby conducting heat from the said minor portions of the heated glass blank at a rate sufficient to form a normally invisible strain in said glass blank without cracking the same.

7. In a method of toughening a glass blank such as a lens, lens blank, watch crystal, or the like having two faces wherein the glass blank is first heated to approximately its softening point and thereafter chilled to form strain therein; the step of conducting strain forming heat from a minor portion on one face and a minor portion on the opposite face of the heated glass blank which consists essentially in gripping the heated glass blank at the said minor portions and thereby supporting the heated glass blank in mid-air between glass blank supporting heat conducting members each shaped to conduct heat from a minor portion on a face of said heated glass blank, thereby conducting heat from the said minor portions of the heated glass blank at a rate sufficient to form a normally invisible strain in said glass blank without cracking the same.

8. In a method of forming a strain and thereby toughening a spectacle lens corrected for vision and having a convex face and a concave face wherein the lens is first heated to approximately its softening point for such a time and degree that the lens substantially maintains its original shape upon chilling without affecting the correction for vision in the lens; the step of conducting heat from a substantially central minor portion of a face of the heated lens which consists essentially of disposing a pointed heat conducting member substantially in contact and substantially in heat conducting relationship with said minor portion of the said face of the heated lens being toughened, thereby to create a strain in said lens.

9. In a method of forming a strain and thereby toughening a spectacle lens corrected for vision and having a convex face and a concave face wherein the lens is first heated to approximately its softening point for such a time and degree that the lens substantially maintains its original shape upon chilling without affecting the correction for vision in the lens; the step of conducting heat from a minor portion on the convex face and a minor portion on the concave face of the heated lens through the medium of two pointed heat conducting members, which consists essentially of disposing one of said heat conducting members substantially in contact and substantially in heat conducting relationship with said minor portion on the convex face of the heated lens being chilled and the other of said heat conducting members in heat transfer relationship with said minor portion on the concave face of the heated lens being toughened, thereby to create a strain in said lens.

10. In a method of toughening a glass blank such as a lens, lens blank, watch crystal, or the like having two faces wherein the glass blank is first heated to approximately its softening point, the step which consists of conducting strain forming heat from a minor substantially central portion on one face of said heated glass blank by disposing a heat conducting member having a minor heat conducting area substantially in contact and substantially in heat conducting relationship with said minor portion of the heated glass blank, thereby conducting heat from the said minor portion on the face of the heated glass blank at a rate sufficient to form a normally invisible strain in said glass blank without cracking the same.

11. In a method of toughening a glass blank having two faces and including the step of heating the glass blank to approximately its softening point, the step of conducting heat from a minor portion of one of the faces of the heated glass blank which consists in substantially horizontally disposing the heated glass blank on a substantially vertical disposed glass blank supporting glass tube shaped to independently and substantially horizontally support said glass blank and to conduct heat from said minor portion on one face thereof, thereby to form strain therein and toughen said glass blank.

12. In a method of toughening a glass blank having two faces wherein said blank is first heated to approximately its softening point and thereafter chilled to form a strain therein, the step of conducting heat from a minor portion on one face and a minor portion on the opposite face of the heated glass blank which consists in gripping said heated glass blank between a pointed heat conducting member and a tubular heat conducting member.

13. In a method of toughening a glass blank having two faces wherein said blank is first heated to approximately its softening point, the step of chilling said heated glass blank which comprises supporting said heated blank between a pointed heat conducting member in glass blank heat conducting relationship with a minor portion on one face thereof and a tubular heat conducting member in glass blank heat conducting relationship with a minor portion on the opposite face of said blank.

14. In a method of toughening a glass blank having two faces wherein said blank is first heated to approximately its softening point, the step of chilling a minor portion on one face and a minor portion on the opposite face of said heated glass blank which comprises gripping said heated glass blank in mid-air between a pointed carbon rod and a tubular glass member.

15. An apparatus of the class described comprising, an upright member, an axially movable pointed carbon rod carried by said upright member, a second pointed carbon rod carried by said upright member and in substantial coaxial alignment with said first mentioned rod, and means carried by said movable rod adapted to stop the downward movement of said movable carbon rod short of said second carbon rod.

16. An apparatus of the class described for toughening a heated glass blank comprising, two substantially vertical heat conducting rods in substantial coaxial alignment, one of said rods being movable, the other of said rods being stationary, a support for said movable rod and said stationary rod, means associated with said movable rod to limit the movement thereof toward said stationary rod, and each of said rods being shaped at one end thereof to transfer heat from a minor portion on a face of a heated glass blank positioned therebetween.

17. An apparatus of the class described for toughening a heated glass blank comprising, two substantially vertical heat conducting rods in substantial coaxial alignment, one of said rods being movable, the other of said rods being stationary, a support for said movable rod and said stationary rod, and each of said rods being shaped at one end thereof to transfer heat from a minor portion on a face of a heated glass blank positioned therebetween.

18. An apparatus of the class described for forming a strain in a heated glass blank having two faces by selectively chilling to toughen the same comprising, two substantially vertically disposed glass blank supporting heat conducting rod members, one of said members being movable, a support for said rod members, and each of said rod members being shaped at the end of heat transfer thereto so as to chill only a minor portion of each face of the heated glass blank positioned therebetween.

19. An apparatus of the class described to toughen a glass blank by chilling opposite faces of said heated glass blank to form a strain pattern therein consisting essentially of, two substantially vertically positioned oppositely disposed glass blank supporting heat conducting rods in substantial coaxial alignment, one of said rods being movable toward and away from the other of said rods in substantially a coaxial direction, the other of said rods being stationary, a support for said movable rod and said stationary rod, and said rods each being shaped at one end thereof to together grip a minor portion of said glass blank and thereby together support and conduct heat from said minor portions on opposite faces of a heated glass blank positioned therebetween.

20. An apparatus for chilling a heated glass blank comprising, two heat conducting members, one of said members being pointed, the other of said members being tubular, a support for said members, one of said members being movable toward and away from the other of said members, and each of said heat conducting members being shaped at the heat conducting end thereof to chill a minor portion of a heated glass blank positioned therebetween.

21. An apparatus for chilling a heated glass blank consisting of, two substantially vertically disposed heat conducting members, a support for said heat conducting members, one of said heat conducting members being pointed, the other of said heat conducting members being tubular, one of said heat conducting members being movable toward and away from the other of said members, and each of said heat conducting members being shaped at the heat conducting end thereof to chill a minor portion of a heated glass blank positioned therebetween.

22. An apparatus of the class described for chilling a heated glass blank to form a strain therein comprising, two oppositely disposed heat conducting members in substantial coaxial alignment, a support for said heat conducting members, one of said members being a pointed carbon rod, the other of said members being a tubular glass member, one of said members being movable toward and away from the other of said members, and each of said heat conducting members being shaped at the heat conducting end thereof to chill a minor portion of a heated glass blank positioned therebetween.

23. An apparatus of the class described for chilling a heated glass blank to form a strain therein comprising, a substantially vertically disposed movable heat conducting member, a substantially vertically disposed stationary heat conducting member, said movable heat conducting member being pointed at one end thereof, said stationary heat conducting member being tubular, a support for said heat conducting members, said stationary heat conducting member being in substantial coaxial alignment with said movable heat conducting member, and each of said heat conducting members being shaped at the heat conducting end thereof to chill a minor portion of a heated glass blank positioned therebetween.

24. An apparatus of the class described, comprising a base, a support bracket mounted on said base and having a C-shaped portion having upper and lower horizontal arms, said upper arm being apertured, a tube disposed in said apertured upper arm, a heat conducting member disposed in said tube and adapted for vertical movement therein, a collar secured to said heat conducting member and movable therewith and adapted to engage with said tube to limit the downward vertical movement of said heat conducting member, said lower arm being recessed, a second heat conducting member secured in said recess in said lower arm, and said second mentioned heat conducting member being in substantial coaxial alignment with said first mentioned movable heat conducting member.

25. An apparatus of the class described, comprising a base, a supporting bracket mounted on said base and having a C-shaped portion having upper and lower horizontal arms, said upper arm being apertured to receive a vertical tube, a pointed heat conducting rod disposed in said tube and adapted for vertical movement therein, a collar secured to said pointed heat conducting rod and movable therewith and adapted to engage with said tube to limit the downward vertical movement of said heat conducting rod, said lower arm being recessed, a tubular heat conducting member being disposed in said recess in said lower arm, and said tubular heat conducting member being in substantial coaxial alignment with said vertically movable pointed heat conducting rod.

26. An apparatus of the class described, comprising a base, a support bracket mounted on said base and having a C-shaped portion having upper and lower horizontal arms, said upper arm being apertured, a tube disposed in said apertured upper arm, a heat conducting member disposed in said tube and adapted for vertical movement therein, a collar secured to said heat conducting member and movable therewith and adapted to engage with said tube to limit the downward vertical movement of said heat conducting member, said lower arm being recessed, a removable element positioned in said recess in said lower arm, a second heat conducting member carried by said removable element positioned in said recess in said lower arm, and said second mentioned heat conducting member being in substantial coaxial alignment with said first mentioned vertically movable heat conducting member.

27. An apparatus for conducting heat from minor portions of a heated glass blank having two faces to form strain therein, consisting of two glass blank supporting heat conducting members adapted to together grip said heated glass blank in mid-air, one of said heat conducting members being movable independently of the other of said heat conducting members, a support for said heat conducting members adapted to permit one of said heat conducting members to move independently of the other of said members, and said heat conducting members each having a minor area of heat conduction at the glass blank heat conducting end thereof to conduct heat from a minor portion on a face of a heated glass blank gripped in mid-air therebetween.

28. An apparatus for conducting heat from minor portions of a heated glass blank having two faces to form strain therein comprising, two substantially vertically disposed substantially oppositely positioned glass blank supporting heat conducting members adapted to together grip said heated glass blank in mid-air, one of said heat conducting members being movable independently of the other of said heat conducting members, a support for said heat conducting members adapted to permit one of said heat conducting members to move independently of the other of said members, and said heat conducting members each having a minor area of heat conduction at the glass blank heat conducting end thereof to conduct heat from a minor portion on a face of a heated glass blank gripped in mid-air therebeween.

29. An apparatus for conducting heat from minor portions of a heated glass blank having two faces to form strain therein, consisting of two heat conducting members, one of said members being spaced from the other of said members and in substantial coaxial alignment, said heat conducting members being substantially in contact with the heated glass blank sufficient to form strain therein, a support for said heat conducting members, and said heat conducting members each having a minor area of heat conduction at the glass blank heat conducting end thereof to conduct heat from a minor portion on a face of a heated glass blank positioned therebetween.

30. The product formed from the method of claim 2.
31. The product formed from the method of claim 12.

References Cited in the file of this patent

UNITED STATES PATENTS

| | | |
|---|---|---|
| Re. 8,400 | Siemens | Sept. 3, 1878 |
| 1,308,820 | Tillyer et al. | July 8, 1919 |
| 1,454,200 | Wells et al. | May 8, 1923 |
| 1,713,854 | Meyer | May 21, 1929 |
| 1,895,548 | Lebel | Jan. 31, 1933 |
| 1,916,174 | Long et al. | June 27, 1933 |
| 1,945,879 | Burger | Feb. 6, 1934 |
| 2,049,075 | Munson | July 28, 1936 |
| 2,131,404 | Long | Sept. 27, 1938 |
| 2,269,060 | Mitford | Jan. 6, 1942 |
| 2,309,325 | Merrill | Jan. 26, 1943 |
| 2,336,200 | Von Reis | Dec. 7, 1943 |
| 2,390,910 | Aksomitas | Dec. 11, 1945 |

FOREIGN PATENTS

| | | |
|---|---|---|
| 333,840 | Great Britain | Aug. 21, 1930 |
| 402,641 | Great Britain | Dec. 7, 1933 |
| 680,578 | France | Jan. 22, 1930 |

OTHER REFERENCES

Lens Hardening Equipment, published by Bausch & Lomb Optical Co., Rochester, N. Y., March 1940, pages 2, 10 to 14.

Willson Products, Inc. Catalog, January 1, 1938, page 15.